3,413,066
COMPARISON PHOTOMETER AND TARGET THEREFOR

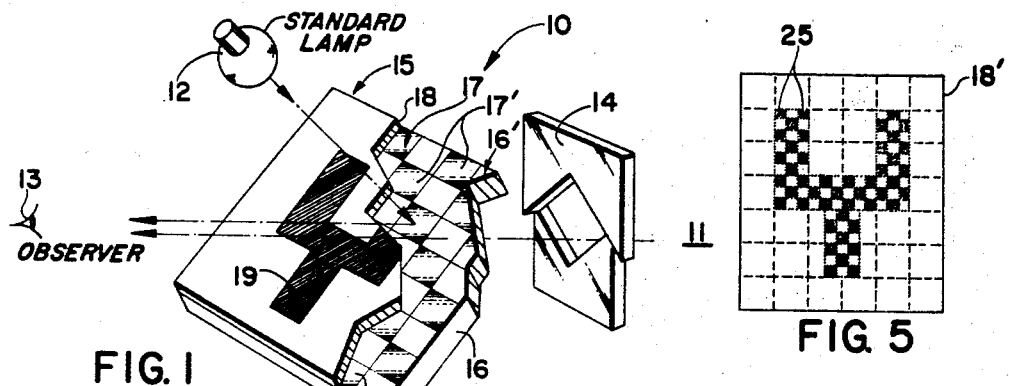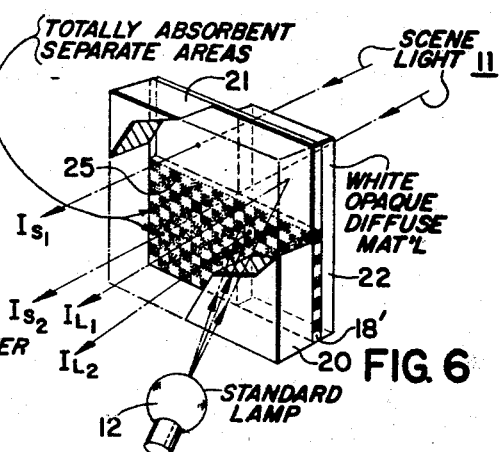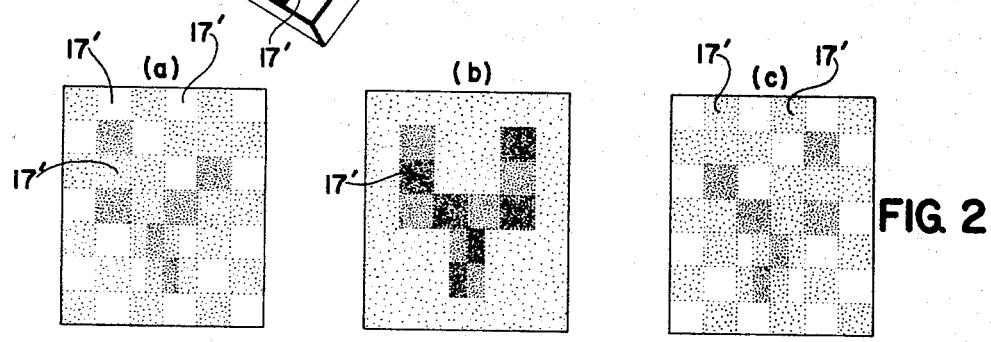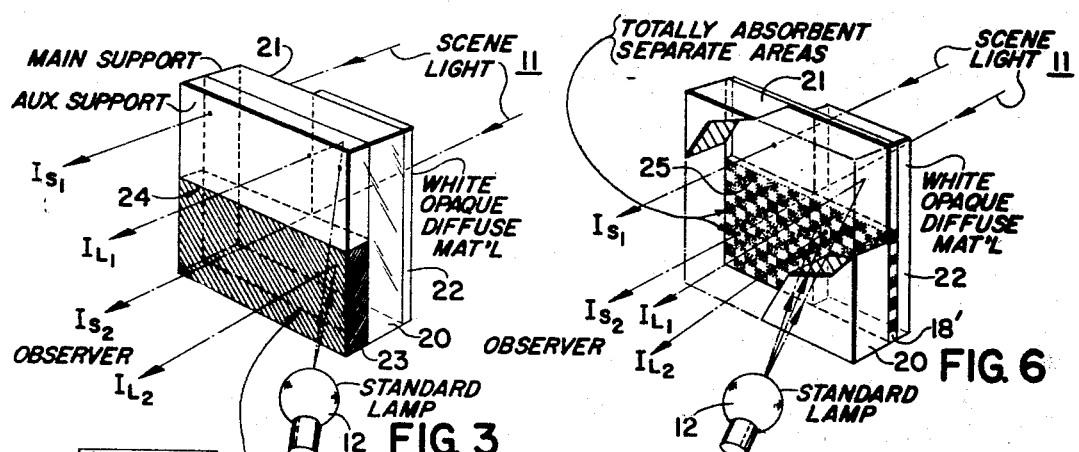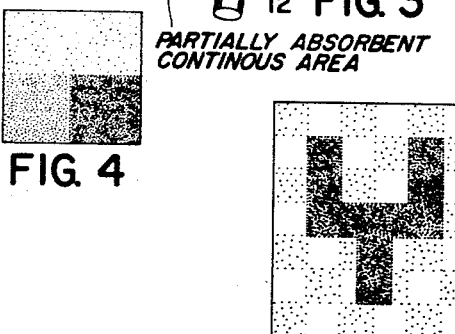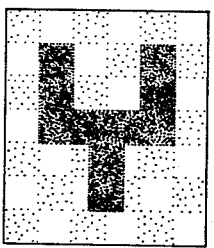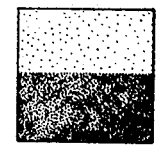

Conrad H. Biber, Needham, and Jeremy M. Topaz, Brighton, Mass., assignors to Polaroid Corporation, Cambridge, Mass., a corporation of Delaware
Filed Nov. 13, 1964, Ser. No. 410,977
9 Claims. (Cl. 356—230)

This invention relates to a target for a comparison photometer of the type providing a positive visual indication to an observer when photometric balance is achieved.

A comparison photometer of the type described is disclosed in copending application Ser. No. 359,113, filed Apr. 13, 1964, owned by the assignee of this application. Such photometer utilizes a diffuse reflecting pattern partially covering a background area and illuminated by one source of light; the background area is substantially uniformly illuminated by another source of light and can be seen through the interstices of the pattern. Thus, an observer sees light from the one source reflected from the pattern and light from the other source transmitted through the interstices of the pattern. When the background (i.e., the interstices of the pattern) appears to the observer as bright as the pattern, the latter disappears because the field is uniformly illuminated, and photometric balance is achieved. When the brightness of one of the light sources is standardized, provision for adjusting the relative radiant output of the two light sources permits the balanced condition to be calibrated in terms of the exposure value necessary to provide proper exposure for film of a given speed. When the relative output is such that the background is brighter than the pattern, the latter appears dark against a light background; and when the relative output is such that the background is less bright than the pattern, the latter appears light against a dark background. By interposing in the observer's field of view between the observer and the pattern, a transparent support containing an index symbol rendered in terms of a low density tone that partially absorbs incident light, the observer sees the index symbol as if it were superimposed upon and in registration with the pattern. Thus, the symbol is always visible to the observer regardless of the photometric relationship between the two light sources, but is intelligible only at photometric balance when the confusing background pattern disappears.

One of the problems associated with a comparison photometer of the type described above is that at photometric balance, various portions of the index symbol have different brightnesses; and to the observer, the symbol appears to be mottled. This phenomenon degrades the sharpness of the symbol and requires the exercise of judgment as to when the symbol is most intelligible, particularly when there is a slight variation in the uniformity of illumination of the reflecting pattern and the background area which causes portions of the pattern to be slightly visible, even though the two light sources are in photometric balance. The cause of this problem can be appreciated from a consideration of the construction of the photometer target, by which is meant the structure that constitutes the pattern and index symbol and which can be placed in an observer's field of view and illuminated by two sources of light in the manner already described. The construction of the target may involve printing the required pattern in opaque white ink on one surface of a clear main support. This defines, when the observer views the pattern through the main support, an essentially diffuse reflecting surface. A clear auxiliary support facing the main support may be provided between the latter and the observer. Such auxiliary support contains the index symbol rendered in terms of areas that partially absorb incident light and is provided between the main support and the observer. When one diffuse light source is placed beyond the main support so that the observer can view the source through the interstices of the pattern, and the other light source is placed between the observer and the auxiliary support so that light from the latter source is diffusely reflected from the pattern into the eye of the observer, the comparison photometer already described results. Because of the confusing nature of the pattern relative to the index symbol, the latter has certain portions which overlie the pattern and other portions which overlie the interstices between the pattern. As a result, light passing through the interstices of the pattern and through portions of the index symbol overlying the interstices is attenuated before reaching the observer's eye so that such portions appear darker to the observer than the overall background at photometric balance. However, light from the second source is attenuated twice by the portions of the index symbol overlying the reflective pattern since the auxiliary support is between the observer and the light source on the one side, and the reflecting pattern on the other. As a result, while the last-described portions appear darker than the overall background, they are also darker than the portions of the index symbol overlying the interstices and the index symbol has a mottled appearance which coincides with the form of the pattern.

Even if the index symbol were first printed on the main support (before the opaque white pattern were laid down), light from the second source incident on the portions of index symbol overlying the reflective pattern still would be attenuated twice while the portions of the symbol overlying the interstices would be attenuated only once. Thus, this expedient fails to solve the problem.

The elimination of the mottled appearance of the index symbol at photometric balance is the primary object of the present invention. Briefly, the invention involves defining the low average density tone of the index symbol by a plurality of small areas that absorb substantially all of the light incident thereon. Thus, in the portions of the symbol overlying the interstices, a predetermined percentage of background light is permitted to reach the observer. In the portions of the symbol overlying the pattern, the same percentage of light is permitted to be reflected back to the observer with the result that all portions of the symbol appear equally bright (actually, equally dark) at photometric balance and the mottled appearance is no longer present.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawing wherein:

FIGURE 1 is a schematic showing of a comparison photometer of the type described utilizing a comparison target;

FIGS. 2(a), (b) and (c) represent the field seen by an observer at three photometric conditions;

FIG. 2(d) represents the field at a slightly unbalanced condition;

FIG. 3 is an elemental area of the comparison target illustrating the reason for the mottled appearance of the index symbol at photometric balance;

FIG. 4 represents how the elemental area of FIG. 3 would appear to an observer at photometric balance;

FIG. 5 shows the target with an index symbol thereon rendered in accordance with the present invention;

FIG. 6 is an elemental area of the novel target disclosed herein illustrating why the index symbol is uniformly bright at photometric balance; and FIG. 7 represents how the elemental area of FIG. 6 would appear to an observer at photometric balance.

Referring now to FIGURE 1, reference numeral 10 designates a comparison photometer of the type described and into which a comparison target is incorporated. As shown in the drawing, photometer 10 is used in connection with two independent sources of light designated 11 and 12 termed scene source and reference source respectively. Details of the photometer such as lens, etc., are not germane to this disclosure, it being understood that source 11 provides a diffuse, substantially uniformly illuminated background area, whose brightness relative to observer 13 is selectively controllable by adjustable diaphragm 14. Target 15 is interposed between the observer and source 11, and in the form shown in FIGURE 1, comprises a main transparent support 16 on one surface 16' of which is provided a reflective pattern 17 defined by areas of opaque white material 17' that diffusely reflects light from source 12 into the eye of observer 13. Thus, the observer sees the substantially uniformly illuminated source 11 through the interstices of pattern 17, and in the same field, sees the pattern substantially uniformly illuminated by source 12. When the background area is brighter than the pattern, the latter appears to observer 13 as being dark against a light background; and when the background area is less bright than the pattern, the latter appears to observer 13 as being bright against a dark background. In other words, there is an inversion in the apparent pattern brightness on passing through photometric balance. At that condition, which is established by selective adjustment of diaphragm means 14, the pattern and the interstices between the pattern are equally bright and observer 13 sees a uniformly illuminated field in which the pattern can no longer be discerned. This is the ideal situation when each reflective area of the pattern has exactly the same quality, reflecting exactly the same amount of light and is uniformly diffuse. Actually, it is difficult to produce this condition without considerable effort in creating the pattern on the support. Hence, in practical embodiments, there are regions in the field of view of the observer when the pattern is faintly discernible even at photometric balance.

Target 15 includes auxiliary transparent support 18 in superposed relationship to main support 16. Support 18 contains index symbol 19 rendered in a low density tone, and for the purpose of simplifying the drawing and description, the symbol shown in the drawing is a Y. However, any other letter or group of letters or any intelligible indicia is intended to be included in the term "index symbol." Support 18 is conventionally a piece of sheet material having photographic emulsion on one surface and which was previously exposed to the desired index symbol and developed to produce a transparency containing the symbol which is defined in terms of areas that partially absorb incident light.

The three possible photometric relationships between sources 11 and 12 are: pattern 17 brighter than the background; pattern 17 equally as bright as the background; and pattern 17 less bright than the background. The view seen by observer 13 in each of these three relationships is shown in FIGS. 2(a), (b) and (c). It should be noted that index symbol 19 is intelligible only in FIG. 2(b) because the entire background against which the symbol is seen is uniformly bright, while in FIGS. 2(a) and 2(c), the index symbol, while visible, is not intelligible due to the confusing nature of the background against which the index symbol is seen. The mottled appearance of the index symbol at photometric balance is illustrated in FIG. 2(b), and the reason for this condition can be appreciated from a consideration of FIGS. 3 and 4 to which reference is now made.

FIG. 3 represents a perspective view of an elemental area of the photometer target shown in FIGURE 1 where reference numeral 20 designates the main support oriented so that surface 21 intersects light from scene source 11; and a portion of the reflective pattern is designated at 22. The latter is constituted by a layer on surface 21 of opaque, white, light-diffusing material. Auxiliary support 23 abuts a surface of support 20 opposite to surface 21 and contains a region denoted at 24 which represents a segment of the index symbol and partially absorbs incident light from source 12. The elemental area illustrated is such that the portion of reflective material 22 shown in FIG. 3 covers the right half of the area; and the partial light absorbing region 24 shown in FIG. 3 covers the lower half of the area. As a consequence, light ray $I_{S_1}$ originating from the scene source passes unattenuated through the overlying clear portions in each of the main and auxiliary supports. On the other hand, light $I_{S_2}$ originating from the scene source passes through a clear portion of the main support but is partially attenuated by region 24 of the auxiliary support with the result that the intensity of ray $I_{S_1}$ exceeds that of $I_{S_2}$. Therefore, the lower left quadrant of the elemental area of FIG. 3 appears to an observer as somewhat darker than the upper left quadrant (see FIG. 4). However, in neither the upper nor lower right quadrants of the area can light from the scene source penetrate to the observer since reflective material 22 is opaque. Thus, ray $I_{L_1}$ originating at the lamp and incident on material 22 after passing through the overlying clear portions in each of the two supports, is reflected toward the eye of the observer by the diffuse nature of material 22. Such ray is not attenuated by its double passage through the clear portions of the two supports. On the other hand, ray $I_{L_2}$ is incident on material 22 after passing through region 24, and is reflected back to the observer after again passing through region 24. Thus, ray $I_{L_2}$ is attenuated twice: once on passing through the auxiliary support toward material 22, and once after being reflected, with the result that the lower right quadrant of the element of FIG. 3 appears to an observer as somewhat darker than the upper right quadrant (see FIG. 4). When photometric balance is achieved, the upper half portion of the element is uniformly bright. The lower half portion is darker than the upper portion but the lower portion is not uniformly dark. In particular; the lower right quadrant (as shown in FIG. 4) will be darker than the lower left quadrant. Since region 24 represents the indicia whose intelligibility is to become manifested at photometric balance, it is apparent that the indicia will have regions whose brightness differs. From this explanation of the conventional photometer target construction, it is believed clear that the mottled nature of the indicia shown in FIG. 2(b) and FIG. 4 arises because the indicia overlies both the reflective portion of the pattern as well as the interstices. At photometric balance the darker portions of the indicia overlie the reflective pattern and the lighter portions overlie the interstices of the pattern thus effectively indicating the nature of the pattern configuration in the region covered by the indicia.

Recalling again that photometric balance is achieved when the background pattern disappears and the index symbol is intelligible, and that the index symbol at balance appears mottled as shown in FIG. 2(b), it will readily be apparent that the mottled nature of the index symbol can be made to disappear by adjusting the diaphragm until the light seen through the interstices of the pattern is sufficiently less bright than the light reflected from the pattern to cause the symbol to be uniformly dark. However, when this occurs, the background, against which the uniformly dark symbol is seen by an observer, is no longer uniformly bright and the pattern is visible. Specifically, the pattern appears bright against a dark background, like that shown in FIG. 2(a). The contrast in this situation, however, depends upon the density of the index symbol. That is to say, the more light absorbed by the symbol, the greater will be the out-of-balance condition at which the index appears uniformly dark.

From the above discussion, it is evident that the true condition of photometric balance, namely disappearance of the background pattern, can be confused by the fact that the index symbol is mottled at balance, but uniformly dark slightly out of balance. Hence, an unsophisticated observer concentrating on adjusting diaphragm 14 to achieve balance by intently observing the symbol until it is most intelligible is apt to produce the slight unbalanced condition shown in FIG. 2(d), particularly when account is taken of the fact that even at balance, portions of pattern may be somewhat visible due to the inherent inability to deposit a diffuse reflective pattern uniformly over the main support. A fair amount of judgment is thus required to be exercised by the observer in order to be assured that a truly balanced condition is achieved. The desirability of reducing the judgment required is obvious. The present invention reduces observer judgment by eliminating the mottled nature of the indicia (so that the latter appears to an observer as uniformly and sharply clear against the background) at exactly that condition in which the background pattern disappears.

This is achieved by causing the low average density tone of the index symbol to be defined, not by continuous regions that partially absorb incident light, but by discontinuous areas that absorb substantially all of the light incident thereon so that light incident on the interstices between the areas passes therethrough unattenuated. An index symbol defined in this manner is illustrated in FIG. 5 which shows an auxiliary transparent support 18' containing an index symbol defined in terms of a plurality of totally light absorbing dots 25. The broken lines represent the location of the background pattern relative to the index symbol.

If the dot area per unit area of the index symbol is $x$, then only $(1-x)(100)$ will be the percentage of incident light on each unit area that will be transmitted through the interstices of the dots. This percentage will be the same whether the incident light continues in the same direction or is reflected from a surface placed adjacent the auxiliary support. To better understand why this is, reference is made to FIGS. 6 and 7 wherein an elemental area of the main transparent support is designated at 20, and surface 21 faces the scene light. An elemental area of auxiliary support 18' abuts surface 21; and as shown in FIG. 6, the upper region of support 18' is transparent while the lower region contains a plurality of separate, opaque, totally light absorbing dots 25, which together with their interstices represent a low average optical density. The right half region of auxiliary support 18' is covered with white, opaque and diffusely reflecting material 22. Thus, the elemental area shown in FIG. 6 resembles that shown in FIG. 3 in that the index symbol has portions overlying the background area and the pattern. The operation, however, is completely different. Thus, ray $I_{S_1}$ originating from source 11 and passing through the upper left quadrant of both supports is unattenuated by the supports and is seen by an observer. Ray $I_{S_2}$, passing through the lower left quadrants of both supports and through the interstices of the dots 25, has the same intensity as ray $I_{S_1}$. However, since the observer's eye in effect spatially integrates all of the rays from source 11 passing through the upper and lower quadrants, the lower quadrant appears darker than the upper quadrant since less light flux is present in the lower quadrant, provided the dot pattern is made fine enough. Actually, $(1-x)(100)$ percent of the light from source 11 incident on a unit area of the dot structure reaches the observer. Particularly when the dot structure of the totally light absorbing areas is fine enough to prevent resolution by the eye, the lower left quadrant appears to be uniformly bright but darker than the upper left quadrant (see FIG. 7).

Ray $I_{L_1}$ originating from lamp 12 passes through the clear upper right quadrants of each transparent support and is diffusely reflected from material 22 into the eye of the observer. Ray $I_{L_2}$ passes through the clear lower right quadrant and in the interstices between the dots 25, being reflected from material 22 into the eye of the observer. As before, only $(1-x)(100)$ percent of the light from lamp 12 incident on a unit area of the dot structure in front of material 22 will be seen by the observer, but this is precisely the same percentage as seen by the observer of light from source 11 incident on a unit area of the dot structure. At photometric balance (intensity of $I_{S_1}$ equals intensity of $I_{L_1}$), consequently, not only is the lower right quadrant darker than the upper right quadrant, but both the lower left and right quadrants are equally bright (see FIG. 7).

Because the intensity of light from lamp 12 must be reduced by the dot structure just once upon incidence on and reflection from material 22, it is clear that the auxiliary support 18' must abut material 22. An ideal way to construct a photometer target utilizing the present invention is to photograph the index symbol through a suitable screen on a sensitive emulsion coating applied to one side of a transparent base. Upon development, a transparency will result with a dot pattern thereon comprising a plurality of substantially totally absorbing separate areas that defines the low average density tone of the index symbol. It should be understood that the dot pattern like that shown in FIG. 5, wherein the dots are contained inside the envelope of the index symbol, is only illustrative, and that this arrangement is equivalent to providing the dots outside the envelope of the index symbol. In any event, having obtained a transparency in this manner, the next step is to deposit the reflective pattern in opaque white ink or paint directly over the emulsion side of the transparency using a standard printing or silk screening process. The resultant target would have the configuration shown in FIG. 6 wherein reference numeral 20 would designate the transparent film base, reference numeral 18' the emulsion on surface 21 of the base, and reference numeral 22 the white ink or paint pattern on the emulsion.

In order to prevent the totally absorbent dots from coating a "shadow" on the white reflective pattern due to illumination by lamp 12 which is skewed relative to the line of sight, the thickness of layer 18' must be kept as small as possible. Such "shadow" will distort the appearance of the index symbol in the region where it overlies the reflective pattern. Consequently, the light-sensitive emulsion which constitutes layer 18' should be as thin as possible, the thickness in FIG. 6 being exaggerated for ease in illustrating the invention.

It should also be understood that the "checkerboard" configuration of the dots shown in FIG. 5 was also selected in order to more easily illustrate the principles of the invention. Thus, the configuration could just as well be a regular array of square or diamond shaped dots, or even round, since the important consideration is that the dots be discrete and substantially totally light absorbing.

Since certain changes may be made in the above method and apparatus without departing from the scope of the invention herein involved, it is intended that all matter contained in the above description or shown in the accompanying drawing shall be interpreted as illustrative and not in a limiting sense.

What is claimed is:

1. In a comparison photometer, the combination of:

(a) a first light source defining a background area of substantially uniform illumination;

(b) target means defining a reflective pattern partially covering said background area, and an index symbol superposed on said pattern and having portions overlying both said background area and said reflective pattern; and (c) a second light source for illuminating said pattern;

(d) said pattern and index symbol being arranged so that the latter is uniquely intelligible only when the level of brightness of said background area bears a predetermined relationship to the level of brightness of said pattern;

(e) said index symbol being defined by a first plurality of areas that absorb substantially all of the light incident thereon and a second plurality of areas that transmit substantially all of the light incident thereon such that all portions of said index symbol appear substantially uniformly bright when the level of brightness of said background area bears said predetermined relationship to the level of brightness of said pattern.

2. Apparatus in accordance with claim 1 wherein said predetermined relationship between the levels of brightness is equality.

3. Apparatus in accordance with claim 2 wherein said target means includes a first transparent support having a surface intersecting light from said first source and said reflective pattern is defined by substantially opaque white material on said surface.

4. Apparatus in accordance with claim 3 wherein said target means includes a second transparent support abutting said surface and provided with said areas that absorb substantially all of the light incident thereon.

5. Apparatus in accordance with claim 4 wherein said white material is deposited on said second support.

6. Apparatus in accordance with claim 5 wherein said white material is such that it is a diffuse reflector of light passing through said first support and the areas of said second support that transmit incident light.

7. Apparatus in accordance with claim 6 wherein said first source is viewable through said first and second supports with said surface on said first support facing toward said first source.

8. A comparison photometer target comprising:
(a) a transparent support member;

(b) means defining a reflective pattern partially covering said support member with interstices between elements of said reflective pattern for the comparison of light reflected from said elements with light transmitted through said interstices; and (c) an index symbol superimposed upon said reflective pattern and having portions thereof overlying both the elements of said reflective pattern and the interstices between such elements, said index symbol being defined by a first plurality of areas that absorb substantially all of the light incident thereon and a second plurality of areas that transmit substantially all of the light incident thereon, each of the respective areas of said index symbol being substantially smaller than the elements and interstices of said reflective pattern on which they are superimposed.

9. A comparison photometer target comprising:
(a) a transparent support member;
(b) an index symbol of low average density tone carried by said support member and defined by a first plurality of areas that absorb substantially all of the light incident thereon and a second plurality of areas that transmit substantially all of the light incident thereon; and
(c) means defining a reflective pattern partially covering said transparent support member with interstices between elements of said reflective pattern for the comparison of light reflected from said elements with light transmitted through said interstices, said elements of said pattern and said interstices being substantially larger than the respective areas of said index symbol and providing a composite background pattern against which said symbol is capable of being visibly differentiated.

References Cited

UNITED STATES PATENTS 3,323,430   6/1967   Cooper.
3,323,431   6/1967   Land.

JEWELL H. PEDERSEN, *Primary Examiner.*

W. A. SKLAR, *Assistant Examiner.*